United States Patent
Huang

[11] Patent Number: 6,042,195
[45] Date of Patent: Mar. 28, 2000

[54] WHEEL MOUNTING ARRANGEMENT FOR A BABY CART

[76] Inventor: Mien Chen Huang, 123-2, Pitou, Kuanmiao, Tainan, Taiwan

[21] Appl. No.: 09/078,591

[22] Filed: May 13, 1998

[51] Int. Cl.[7] ............................................. B60B 37/00
[52] U.S. Cl. ................................. 301/111; 301/121
[58] Field of Search ............................. 301/111, 112, 301/118, 119, 120, 121, 122; 16/18 R, 45, 46, 20, 29

[56] References Cited

U.S. PATENT DOCUMENTS 5,029,946   7/1991   Liao ..................................... 301/111

FOREIGN PATENT DOCUMENTS 707183   4/1954   United Kingdom ................. 301/120

*Primary Examiner*—Russell D. Stormer
*Attorney, Agent, or Firm*—Pro-Techtor International Services

[57] ABSTRACT

A wheel mounting arrangement includes a holder base having a bottom chamber, a transverse through hole across the bottom chamber, a top chamber, and a radial locating slot communicating with the top chamber, a retainer fastened to the bottom of a wheel tube to secure the wheel tube to the longitudinal top chamber, a wheel axle mounted in the transverse through hole of the holder base to hold a pair of wheels, a stop block coupled to the wheel axle inside the bottom chamber and forced downwards by a compression spring in the bottom chamber, wherein the retainer has a bottom block plugged into the bottom end of the wheel tube, and two curved springy retaining rods stopped against the inside wall of the wheel tube, one curved springy retaining rod having a hooked top end extended out of a locating hole on the wheel tube and engaged into the radial locating slot on the holder base to secure the wheel tube to the holder base.

2 Claims, 6 Drawing Sheets

WHEEL MOUNTING ARRANGEMENT FOR A BABY CART

BACKGROUND OF THE INVENTION

The present invention relates to baby carts, and more specifically to a wheel mounting arrangement for a baby cart which can be detachably conveniently installed.

The wheels of regular baby carts are commonly rotatable for easy steering control. Figures from 1 to 3 show a wheel mounting arrangement for a baby cart according to the prior art. This wheel mounting arrangement comprises a holder base 10, a compression spring 20, a stop block 30, a coupling block 40, and a rivet 50. The holder base 10 comprises a longitudinal bottom chamber 30, a transverse through hole 102 across the longitudinal bottom chamber 30, and a longitudinal through hole 103. The compression spring 20 is mounted in the longitudinal bottom chamber 30. The stop block 30 is inserted into the longitudinal bottom chamber 30 and stopped at the bottom end of the compression spring 20. A wheel axle 601 is inserted through the transverse through hole 102 on the holder base 10 and a transverse through hole 301 on the stop block 30 to hold a pair of wheels 60. The compression spring 20 imparts a downward pressure to the wheel axle 601 through the stop block 30. The coupling block 40 is fastened to the bottom end of the wheel tube 70 by the rivet 50. The coupling block 40 has a bottom extension rod 401, and two spring hooks 402 raised from the periphery of the bottom extension rod 401 at two opposite sides. When the coupling block 40 is inserted into the longitudinal through hole 103 on the holder base 10, the flanged top end of the coupling block 40 is stopped outside the longitudinal through hole 103 at the top, and the spring hooks 402 are hooked on the peripheral bottom edge of the longitudinal through hole 103 to stop the coupling block 40 from upward movement relative to the holder base 10, and to let the coupling block 40 be rotated with the wheel tube 70 in the longitudinal through hole 103 of the holder base 10. When the spring hooks 402 are pressed inwards and disengaged from the peripheral bottom edge of the longitudinal through hole 103, the coupling block 40 and the wheel tube 70 are disconnected from the holder base 10. This wheel mounting arrangement is complicated and expensive. During assembly process, the coupling block 40 must be fastened to the wheel tube 70 by the rivet 50 before installation of the coupling block 40 in the longitudinal through hole 103 of the holder base 10.

SUMMARY OF THE INVENTION

The present invention has been accomplished to provide a wheel mounting arrangement which eliminates the aforesaid drawbacks. It is one object of the present invention to provide a wheel mounting arrangement which has a simple structure. It is another object of the present invention to provide a wheel mounting arrangement which is detachable, and can be conveniently installed. According to one embodiment of the present invention, the wheel mounting arrangement comprises a holder base having a bottom chamber, a transverse through hole across the bottom chamber, a top chamber, and a radial locating slot communicating with the top chamber, a retainer fastened to the bottom of a wheel tube to secure the wheel tube to the longitudinal top chamber, a wheel axle mounted in the transverse through hole of the holder base to hold a pair of wheels, a stop block coupled to the wheel axle inside the bottom chamber and forced downwards by a compression spring in the bottom chamber, wherein the retainer has a bottom block plugged into the bottom end of the wheel tube, and two curved springy retaining rods stopped against the inside wall of the wheel tube, one curved springy retaining rod having a hooked top end extended out of a locating hole on the wheel tube and engaged into the radial locating slot on the holder base to secure the wheel tube to the holder base.

DETAILED DESCRIPTION OF THE PREFERRED EMBODIMENT

Figure 1:
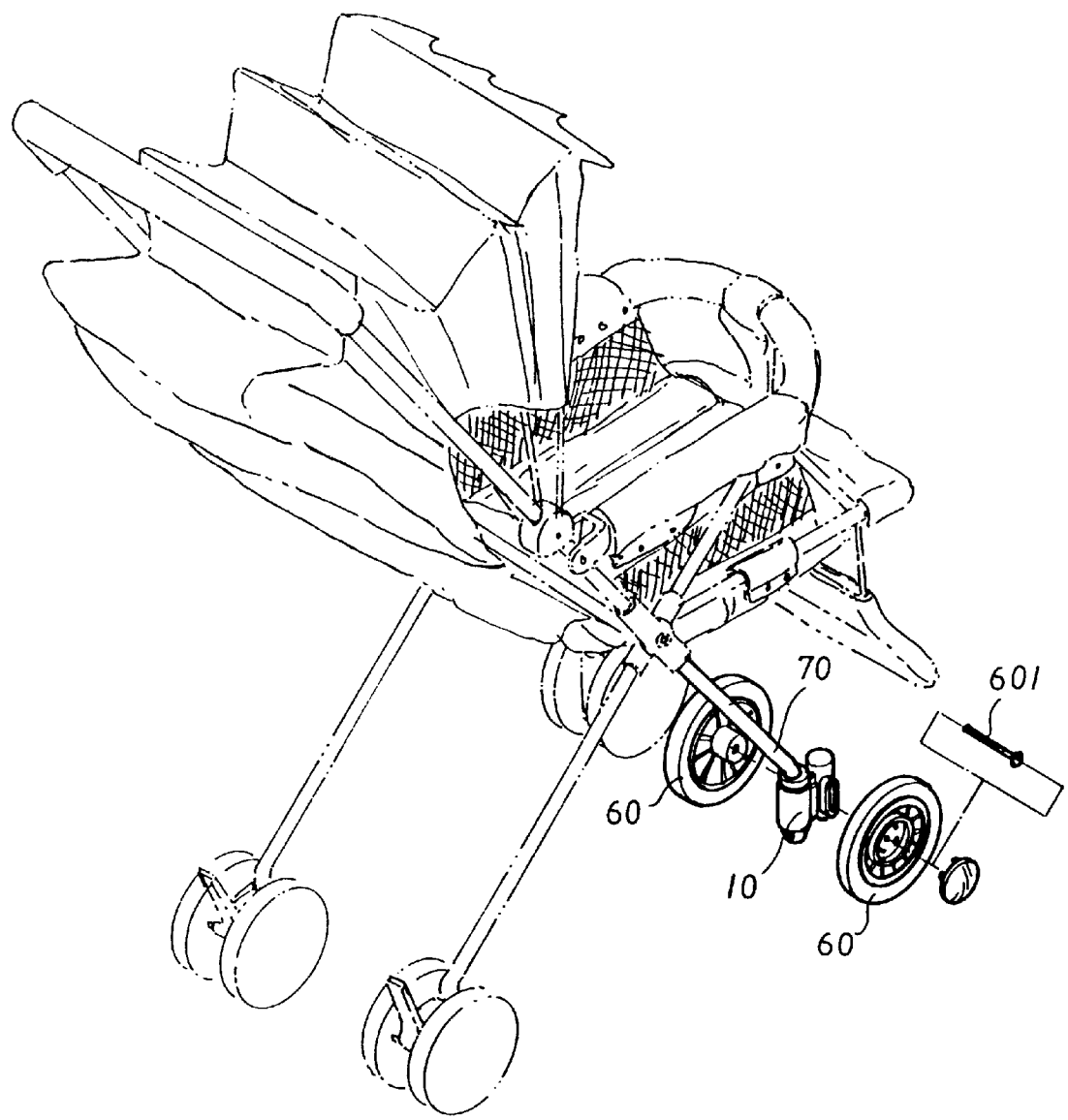
FIG. 1 is an exploded view of a wheel mounting arrangement of a baby cart according to the prior art.
Figure 2:
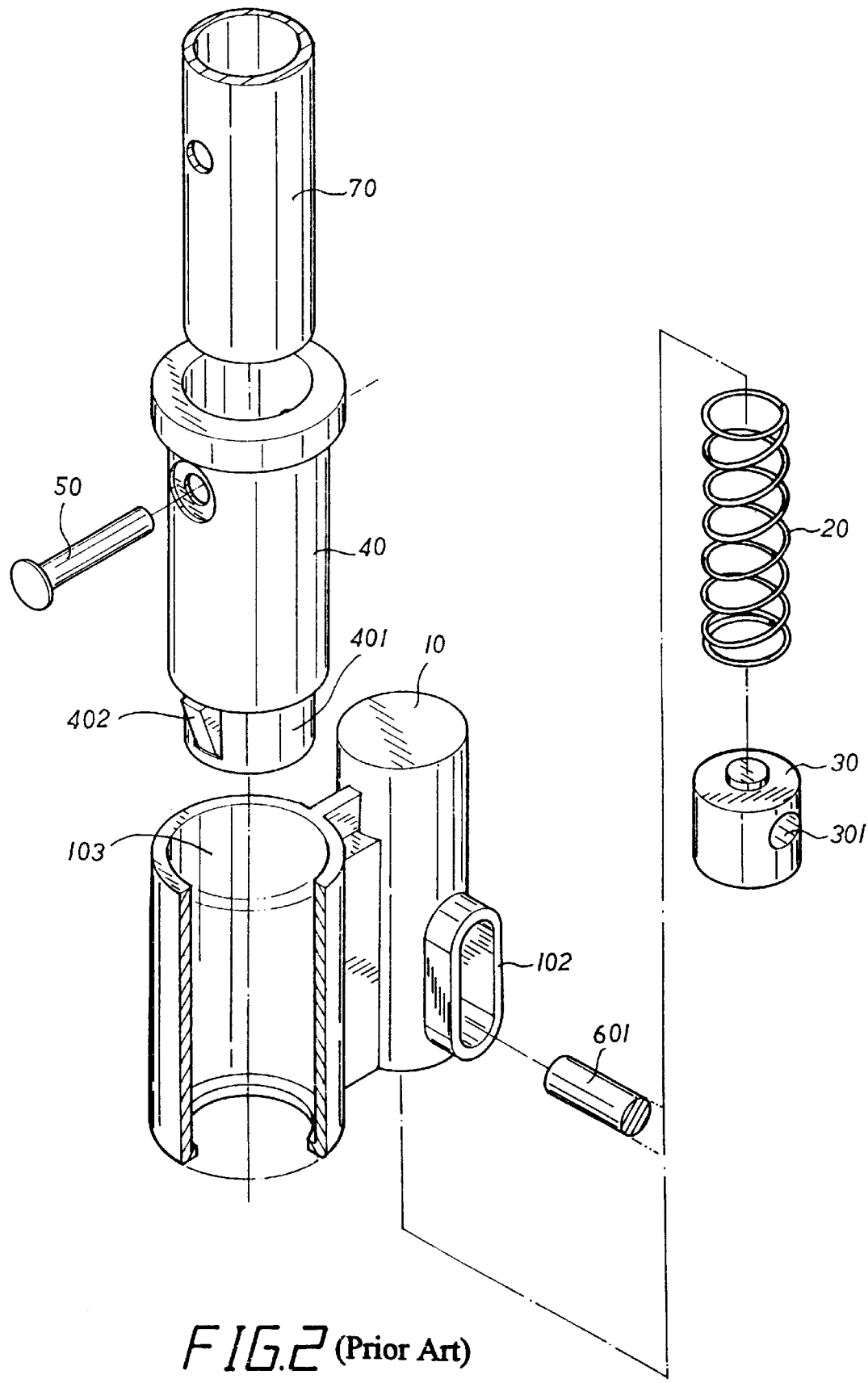
FIG. 2 is a perspective exploded view in an enlarged scale of a part of FIG. 1.
Figure 3:
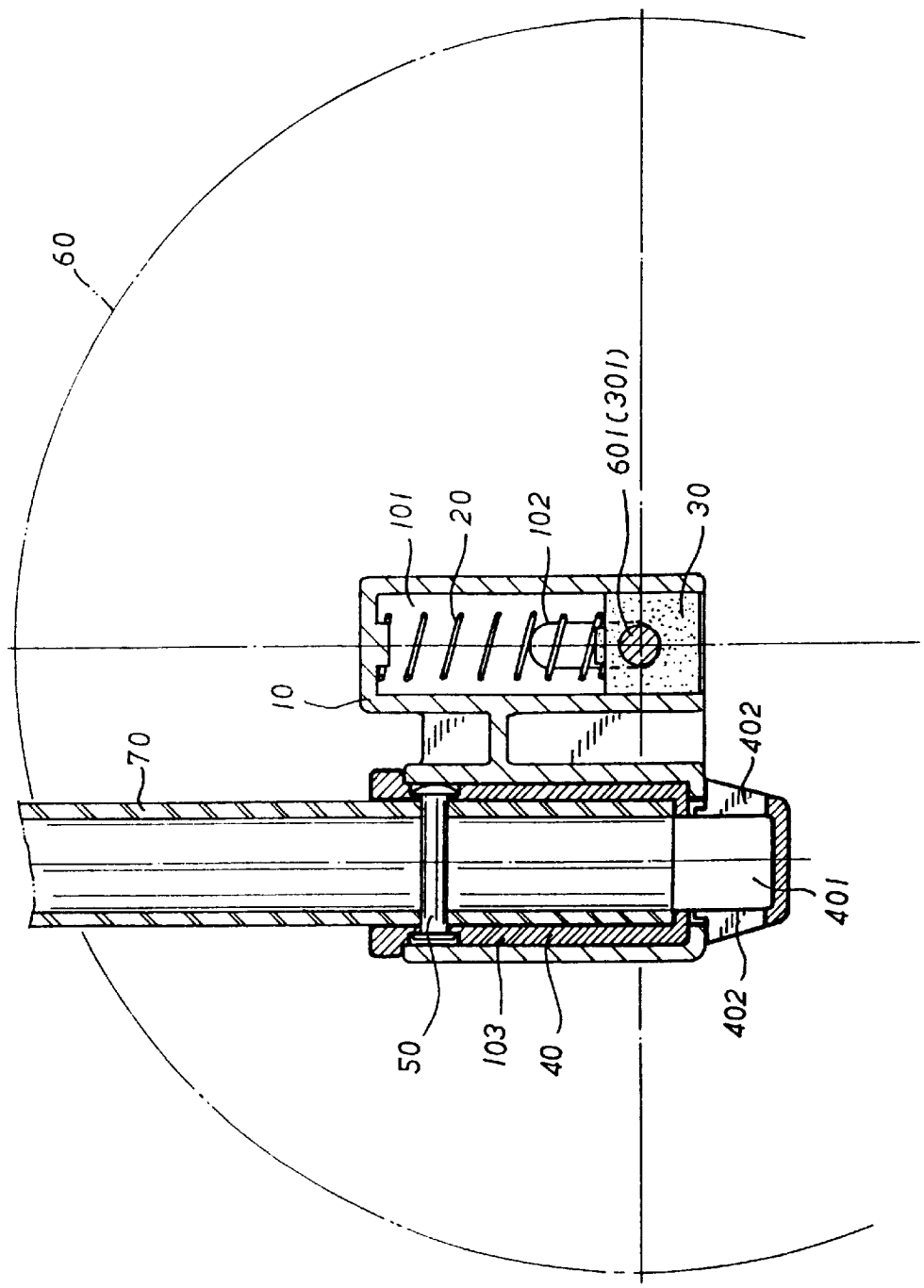
FIG. 3 is a sectional assembly view of FIG. 2.
Figure 4:
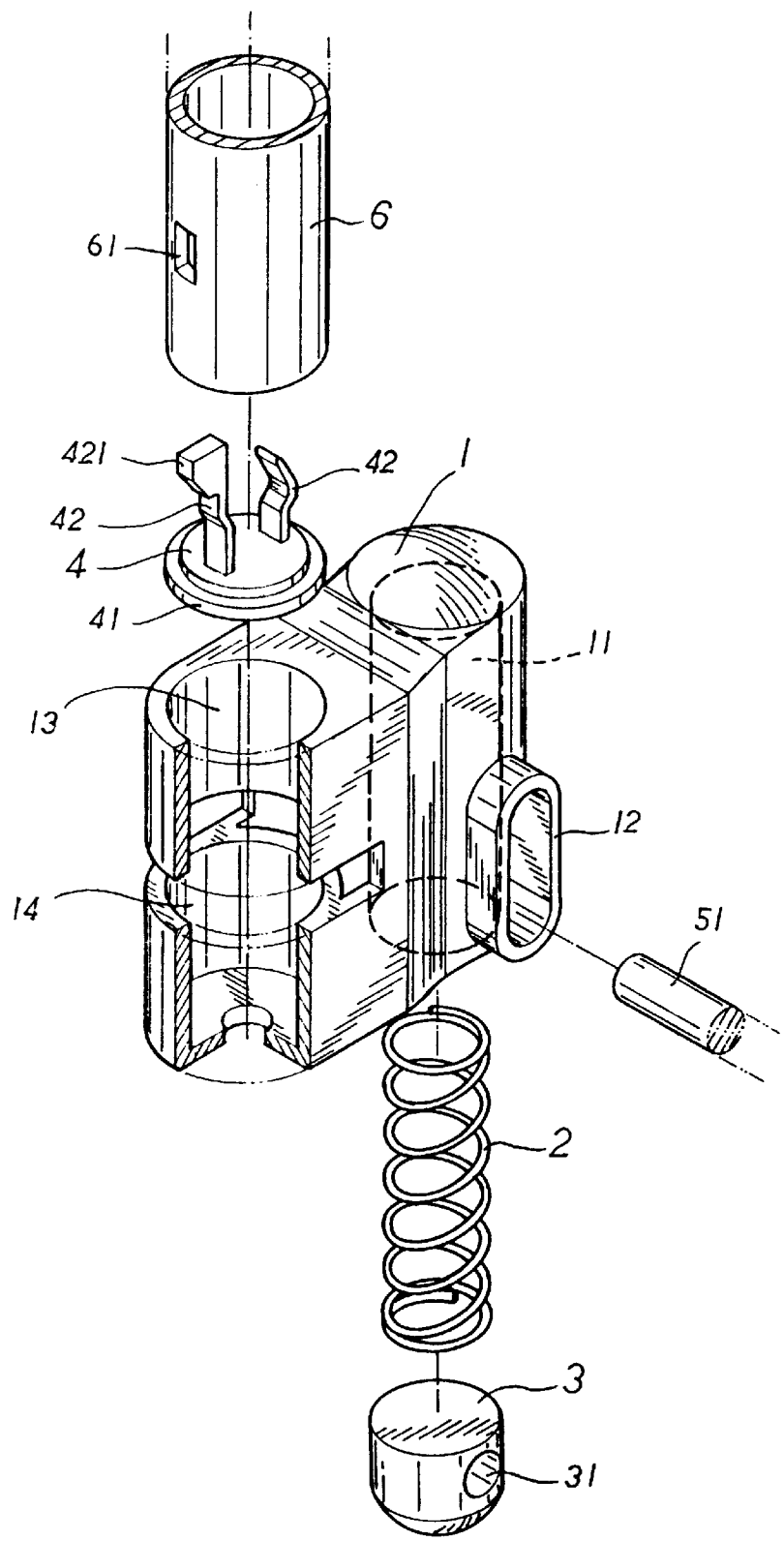
FIG. 4 is a perspective exploded view of a wheel mounting arrangement according to the present invention.
Figure 5:
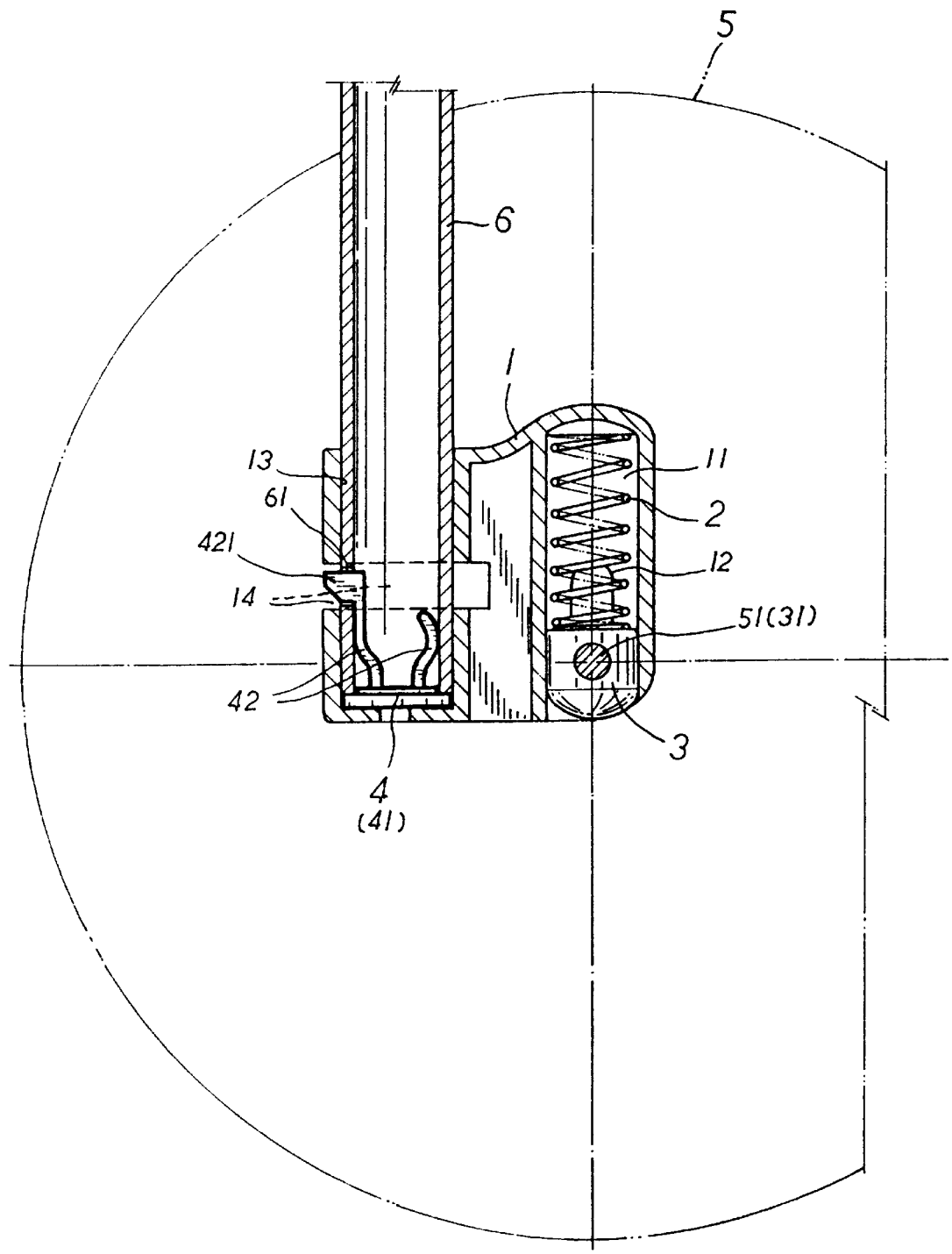
FIG. 5 is a sectional assembly view of FIG. 4.

Referring to FIGS. 4 and 5, a wheel mounting arrangement in accordance with the present invention is generally comprised of a holder base 1, a compression spring 2, a stop block 3. and a retainer 4.

The holder base 1 comprises a longitudinal bottom chamber 11 and a longitudinal top chamber 13 arranged in parallel, a transverse through hole 12 across the longitudinal bottom chamber 11, and a radial locating slot 14 in communication with the longitudinal top chamber 13. The compression spring 2 is mounted within the longitudinal bottom chamber 11. The stop block 3 is inserted into the longitudinal bottom chamber 11 to stop the compression spring 2 inside the longitudinal bottom chamber 11. The stop block 3 has a transverse through hole 31. A wheel axle 51 is inserted through the transverse through hole 12 into the transverse through hole 31 on the stop block 3 to hold two wheels 5 at both ends. The transverse through hole 31 is an oblong hole which allows the wheel axle 51 to be moved vertically within a limited range relative to the holder base 1.

The retainer 4 comprises a flat, stepped bottom block 41, and two curved springy retaining rods 42 raised from the bottom plate 41. The bottom block 41 is fastened to the bottom end of a front wheel tube 6 (see FIG. 5). The curved springy retaining rods 42 are stopped against the inside wall of the front wheel tube 6. One of the curved springy retaining rods 42 has a hooked top end 421 extending out of a locating hole 61 on the front wheel tube 6. When the front wheel tube 6 is inserted into the longitudinal top chamber 13, the retainer 4 is pressed against the bottom wall of the longitudinal top chamber 13, and the hooked top end 421 is slidably hooked in the radial locating slot 14 to secure the front wheel tube 6 in place, enabling the front wheel tube 6 to be rotated in the longitudinal top chamber 13 within a limited angle (subject to the radial width of the radial locating hole 14.

Referring to FIGS. 4 and 5 again, after installation of the retainer 4 in the bottom end of the front wheel tube 6, the hooked top end 421 projects out of the locating hole 61 on the front wheel tube 6. When the front wheel tube 6 with the retainer 4 are inserted into the longitudinal top chamber 13, the hooked top end 421 is forced inwards, enabling the front wheel tube 6 to be completely inserted into the longitudinal top chamber 13. After insertion, the spring power of the material property of the retainer 4 immediately forces the hooked top end 421 out of the locating hole 61 again, and therefore the hooked top end 421 is forced into engagement with the radial locating slot 14 on the holder base 1 to secure the front wheel tube 6 in place. When the hooked top end 421 is forced inwards to disengage the retainer 4 from the holder base 1, the front wheel tube 6 can then be removed from the holder 1.

Figure 6:
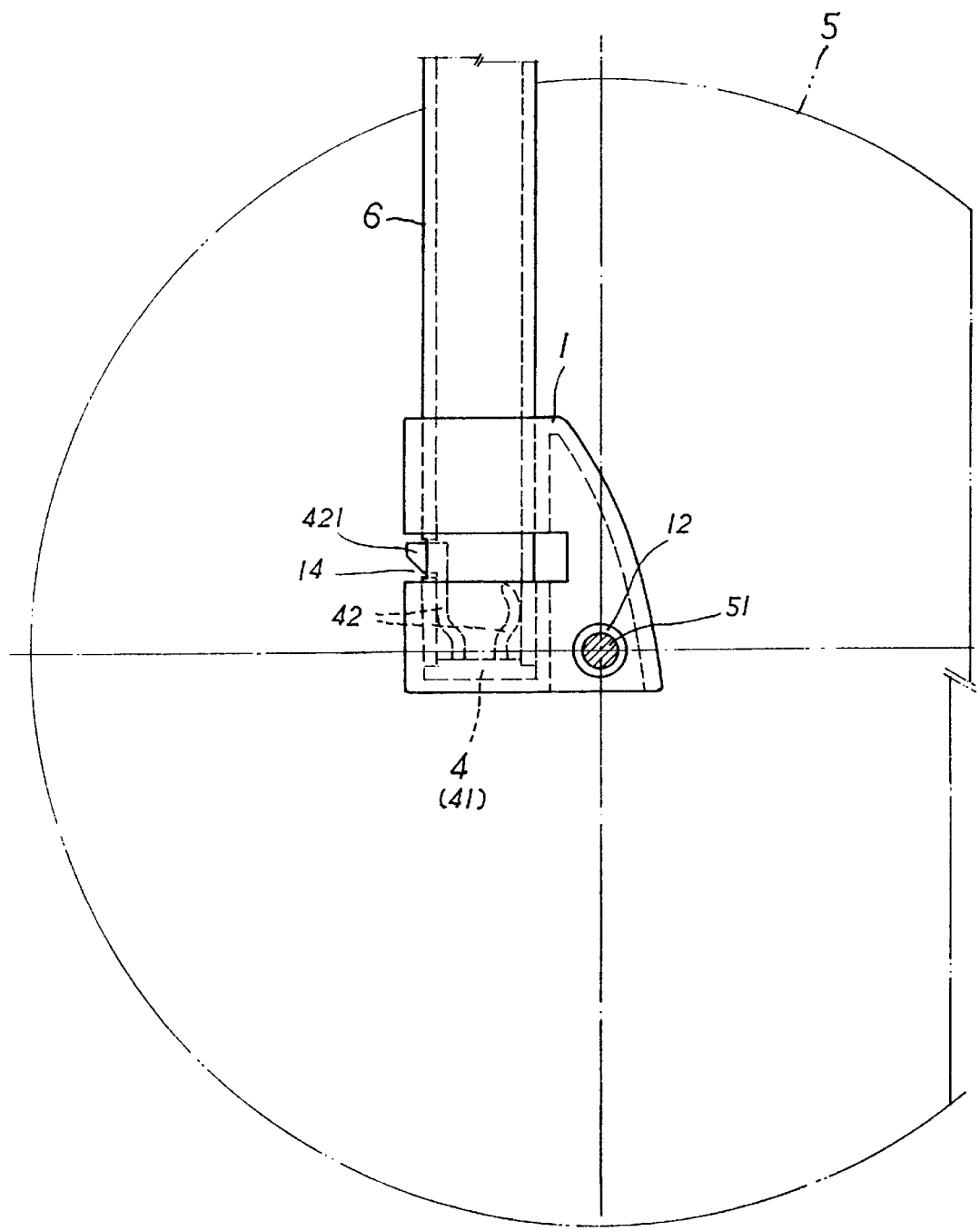
FIG. 6 is a sectional view of an alternate form of the present invention.

FIG. 6 shows an alternate form of the present invention, in which the aforesaid longitudinal bottom chamber 11, compression spring 2 and stop block 3 are eliminated, and the wheel axle 51 is mounted in the transverse through hole 12 to hold two wheels 5 at both ends. According to this alternate form, the wheels 5 cannot be moved vertically relative to the holder base 1.

It is to be understood that the drawings are designed for purposes of illustration only, and are not intended as a definition of the limits and scope of the invention disclosed.

What the invention claimed is:

1. A wheel mounting arrangement comprising:

a holder base having a transverse through hole and a longitudinal top chamber spaced apart from said transverse through hole at one side, a wheel axle mounted in said transverse through hole to hold a pair of wheels, and a wheel tube having a top end integral with a frame of a baby cart and a bottom end inserted into the longitudinal top chamber of said holder base, and a retainer fastened to a bottom end of said wheel tube to secure said wheel tube to said holder base, wherein said holder base comprises a radial locating slot disposed in communication with said longitudinal top chamber;

said wheel tube has a locating hole corresponding to said radial locating slot; said retainer comprises a stepped bottom block partially plugged into said bottom end of said wheel tube and partially stopped outside said bottom end of said wheel tube within said longitudinal top chamber of said holder base, and two curved springy retaining rods bilaterally stopped against an inside wall of said wheel tube, one of said curved springy retaining rods having a hooked portion projecting out of said locating hole on said wheel tube and engaging said radial locating slot on said holder base to secure said wheel tube to said holder base, enabling said wheel tube to be rotated in said longitudinal top chamber within a limited angle.

2. The wheel mounting arrangement of claim 1 wherein said wheel holder further comprises a longitudinal bottom chamber in communication with said transverse through hole, a compression spring mounted inside said longitudinal bottom chamber, and a stop block coupled to said wheel axle inside said longitudinal bottom chamber and stopped against a bottom end of said compression spring.

* * * * *